United States Patent
Lin

(10) Patent No.: US 7,368,055 B2
(45) Date of Patent: May 6, 2008

(54) STRUCTURAL IMPROVEMENT FOR A WATER PURIFIER

(76) Inventor: Tung-Po Lin, P.O. Box 697, Fongyuan City, Taichung County (TW) 420

( * ) Notice: Subject to any disclaimer, the term of this patent is extended or adjusted under 35 U.S.C. 154(b) by 483 days.

(21) Appl. No.: 11/186,954

(22) Filed: Jul. 22, 2005

(65) Prior Publication Data

US 2007/0017856 A1    Jan. 25, 2007

(51) Int. Cl.
  *B01D 63/00*  (2006.01)
  *E03C 1/00*   (2006.01)
  *B01D 61/00*  (2006.01)

(52) U.S. Cl. .............. 210/258; 210/257.2; 210/259; 210/237; 210/321.6; 210/650; 210/652; 137/565.01

(58) Field of Classification Search ............ None
See application file for complete search history.

(56) References Cited

U.S. PATENT DOCUMENTS

| | | | | |
|---|---|---|---|---|
| 4,830,744 A | * | 5/1989 | Burrows | |
| 4,909,934 A | * | 3/1990 | Brown et al. | |
| 5,112,477 A | * | 5/1992 | Hamlin | |
| 5,223,132 A | * | 6/1993 | Yoon | 210/232 |
| 5,269,919 A | * | 12/1993 | Von Medlin | |
| 5,560,393 A | * | 10/1996 | Clack | 137/562 |
| 5,565,100 A | * | 10/1996 | Deng | 210/257.2 |
| 5,658,457 A | * | 8/1997 | Schoenmeyr | 210/97 |
| 5,705,066 A | * | 1/1998 | Treu et al. | |
| 5,766,453 A | * | 6/1998 | Morellato et al. | 210/143 |
| 5,853,572 A | * | 12/1998 | Kuennen et al. | 210/87 |
| 5,855,796 A | * | 1/1999 | Joung | 210/744 |
| 5,928,503 A | * | 7/1999 | Shang-Chun | 210/86 |
| 5,957,339 A | * | 9/1999 | Deni et al. | 222/190 |
| 6,001,249 A | * | 12/1999 | Bailey et al. | 210/232 |
| 6,099,735 A | * | 8/2000 | Kelada | |
| 6,120,682 A | * | 9/2000 | Cook | |
| 6,123,837 A | * | 9/2000 | Wadsworth et al. | 210/87 |
| 6,139,726 A | * | 10/2000 | Greene | 210/94 |
| 6,245,229 B1 | * | 6/2001 | Kool et al. | 210/232 |
| 6,342,154 B2 | * | 1/2002 | Barnes | |
| 6,370,884 B1 | * | 4/2002 | Kelada | |
| 6,558,537 B1 | * | 5/2003 | Herrington et al. | |
| 2002/0014461 A1 | * | 2/2002 | Kuennen et al. | |
| 2002/0185423 A1 | * | 12/2002 | Boyd et al. | |
| 2003/0107907 A1 | * | 6/2003 | Mihai et al. | |

* cited by examiner

*Primary Examiner*—Krishnan S Menon

(57) ABSTRACT

A structure improvement for a water purifier includes a streamlined main body combined by a pair of the symmetrically arranged half housings each of which has a large opening closed by a lid, a motor unit, a pipeline and a flat rectangular rack disposed inside the main body, a plurality of the membrane pipes and the filter element horizontally and superimposedly secured to two sides of the rack automatically connected to the pipeline and a water outlet. A bottom and a cup seat at front side, a socket aside several pipes and plurality of the air vents at rear side of the main body, an arcuate handle on the top, a sensor, an electric circuit card and a TDS (total dissolved solids) remover device inside the main body.

7 Claims, 5 Drawing Sheets

STRUCTURAL IMPROVEMENT FOR A WATER PURIFIER

BACKGROUND OF THE INVENTION

The present invention relates to water purifying apparatus and more particularly to a structural improvement for a water purifier which can rapidly and individually change the filters and is easy to maintain and directly discharge purified water to the consumers.

Prior art water purifier contains several filter elements which is positioned superimposed and a set of pipelines. The problem is that the filter elements must be previously superimposed. Then connected to the set of pipelines during the assembly thus the flow of water can be passing through the filters. When disassembling, one has to disassemble the block plate on the back side at first, then disconnects all the filter elements with the set of pipelines that causes great inconvenience. Especially the assembly of the new filter element, the user some times causes miss connection of the filter element to the wrong pipe due to that the pipelines is very complicated. Further, the old filter elements is not that every one needs to change. But for their collective structure, no matter whether it is good or bad that they have to be wholly replaced that causes considerable waste. Besides, the narrow outlet (normally only a single outlet) is very difficult to assemble or disassemble the filter elements. These are the defects that has to be improved.

Furthermore, a conventional water purifiers is generally accumulate a high amount TDS (total dissolved solids) water between the last and the next discharging of pure water. If this high TDS mixes within the pure water, it would be cause that the user drinks no good pure water.

SUMMARY OF THE PRESENT INVENTION

The present invention has a main object to provide a structural improvement for a water purifier in which the pipeline is already existed, only sleeves the filer elements on one by one basis and from two lateral sides of the machine, the assembly would be therefore accomplished.

Another object of the present invention is to provide a structural improvement for a water purifier in which the filter elements are assembled one by one.

Further object of the present invention is to provide a structural improvement for a water purifier. Before discharging the pure water, releases the high amount of the TDS (total dissolved solids) accumulated in the membrane pipes for few seconds.

Accordingly, the structural improvement for a water purifier of the present invention comprises a main body having a motor unit and pipeline already installed in, several membrane pipes and several filter elements disposed on a vertical rack and connected to the pipeline to supply pure water to the user and the waste water will be release out of the other passage. It is characterized in that the main body has the openings in two lateral sides and the rack has a plurality of retaining rings and a plurality of C-shaped retaining ring disposed on two side for respectively engaging with the membrane pipes and the filler elements which are vertically superimposed. A circuit card inserts into the main body for controlling that the high amount of TDS (total dissolved solids) shall be released few seconds before next discharging of the pure water.

The present invention will become more fully understood by reference to the following detailed description thereof when read in conjunction with the attached drawings.

DETAILED DESCRIPTION OF THE PREFERRED EMBODIMENT

Figure 1:
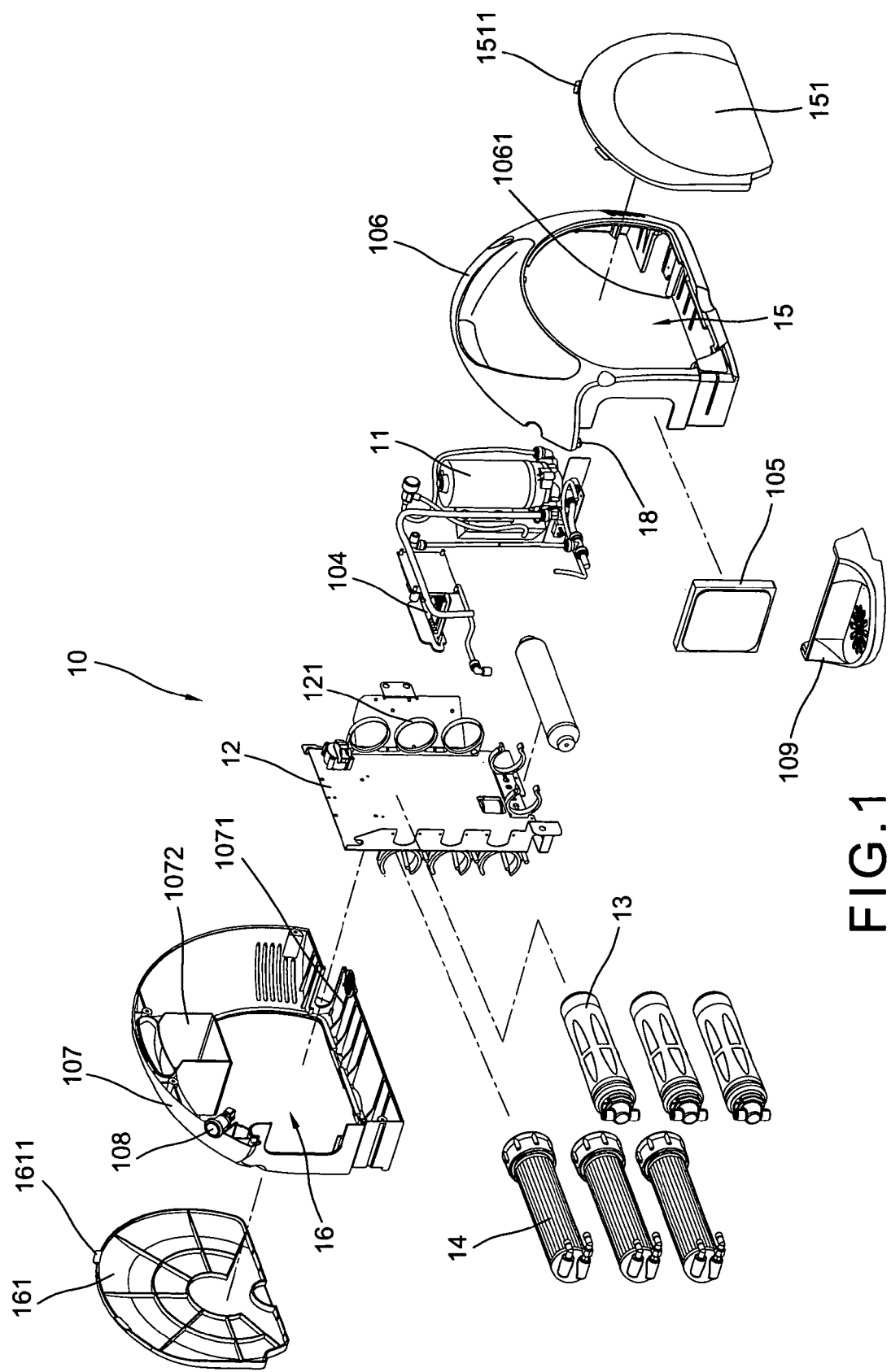
FIG. 1 is an exploded perspective view to show the preferred embodiment of the structural improvement of water purifier of the present invention.
Figure 2:
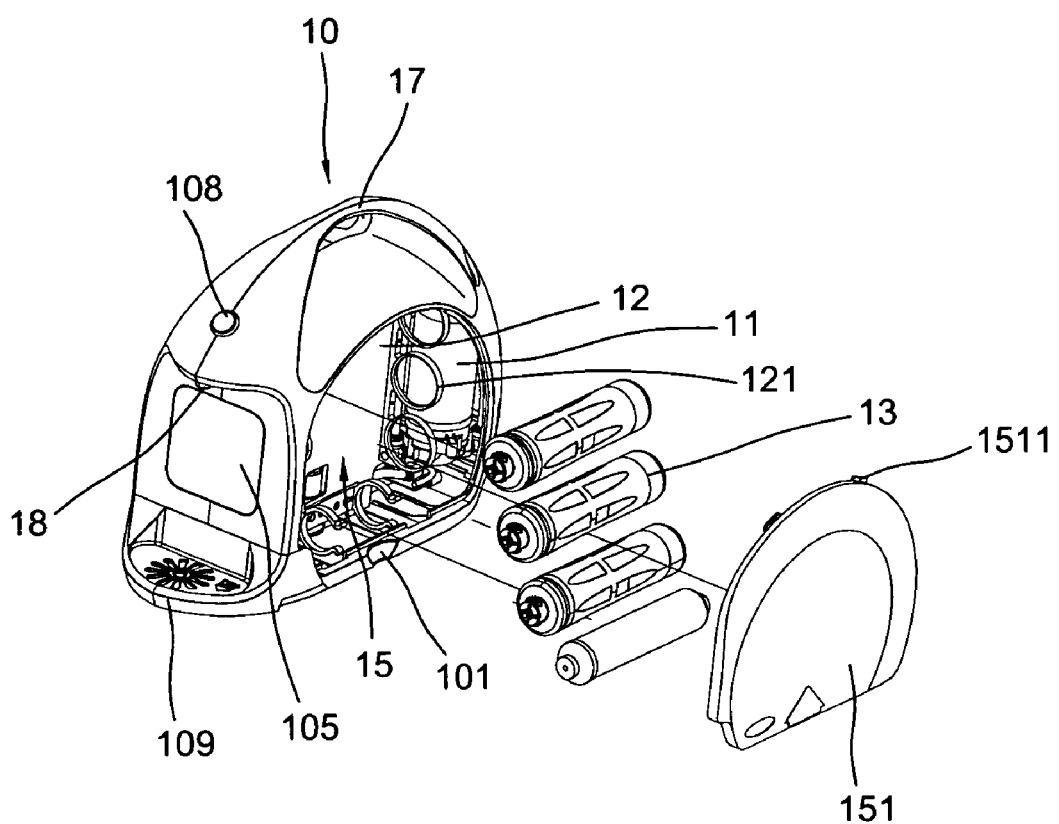
FIG. 2 is an exploded perspective view to show the assembly of the components from right side.
Figure 3:
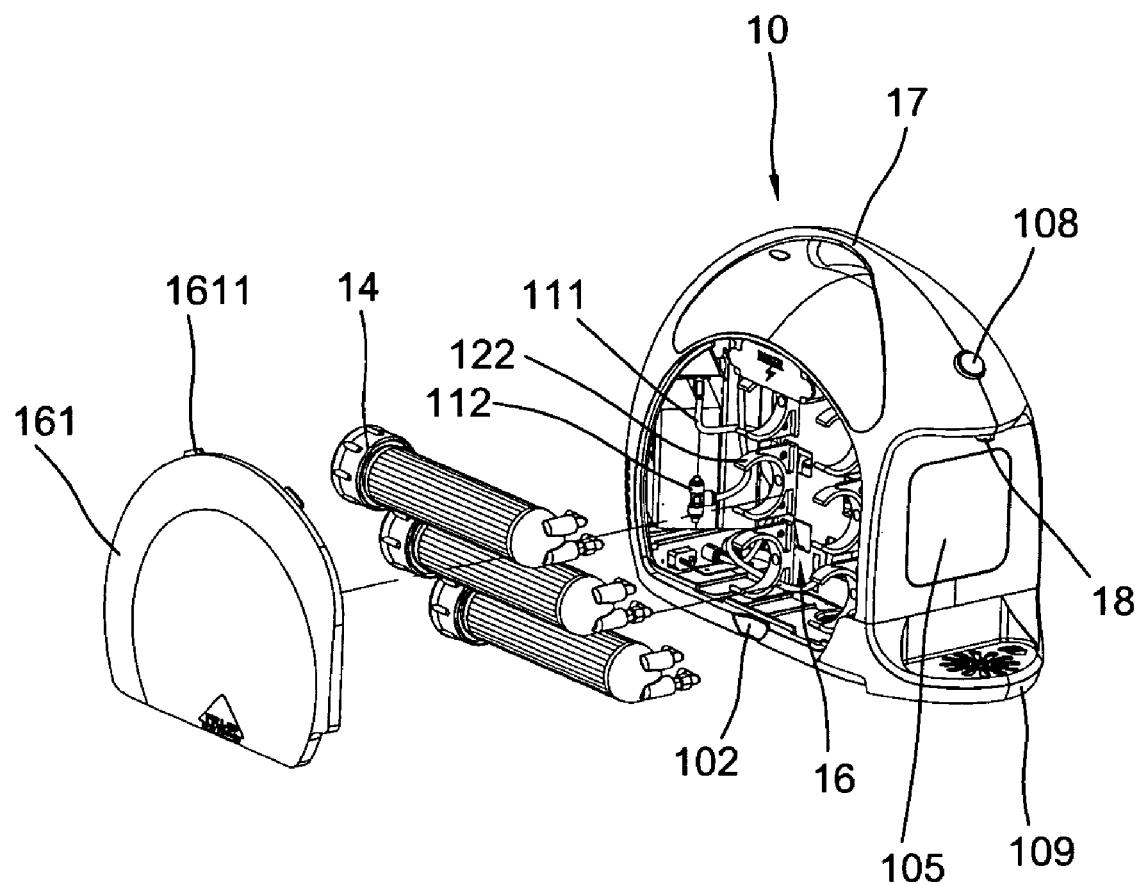
FIG. 3 is an exploded perspectively view to show the assembly of the components from left side.
Figure 4:
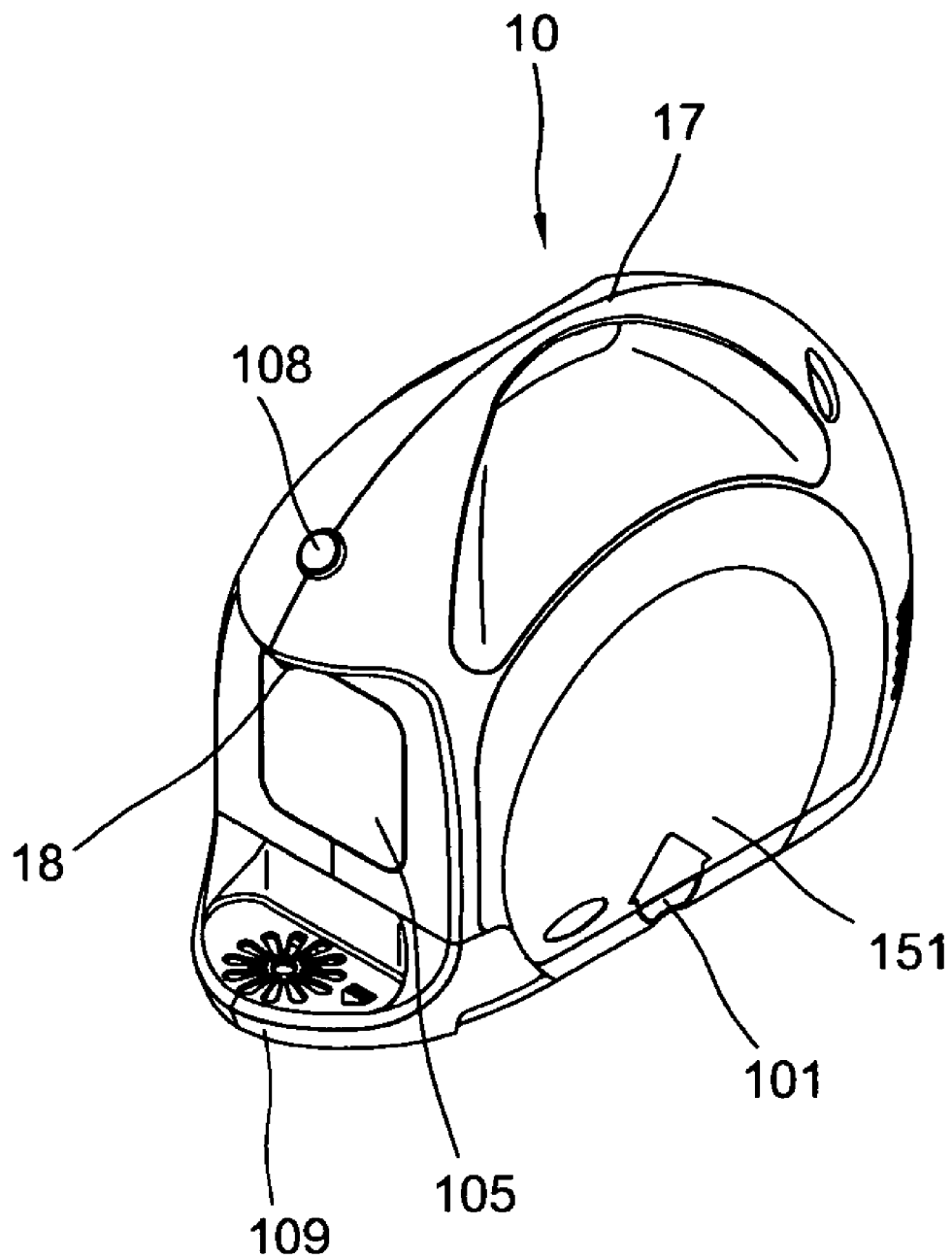
FIG. 4 is a perspective view to show an assembled water purifier of the present invention.
Figure 5:
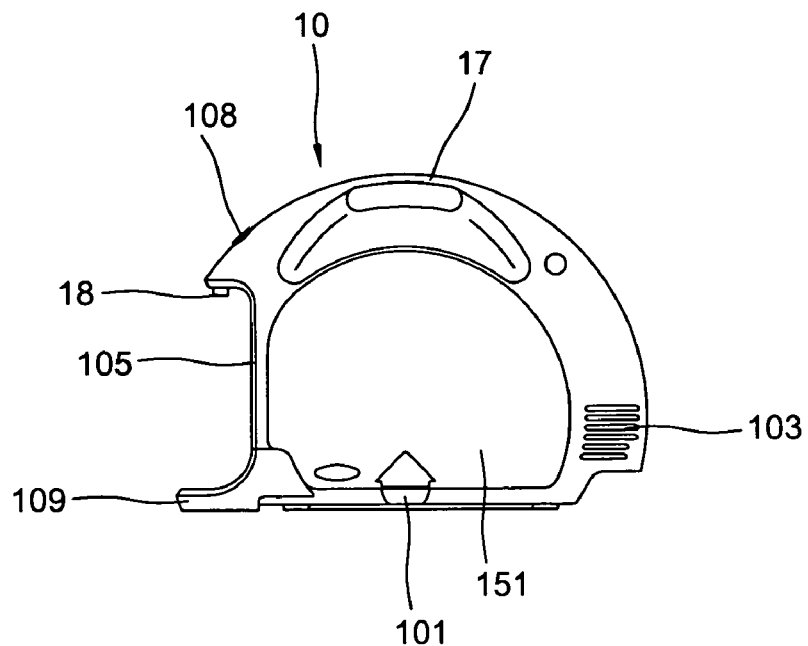
FIG. 5 is a plane view of the water purifier looking from right side and FIG. 6 is a plane view of the water purifier looking from backside.
Figure 6:
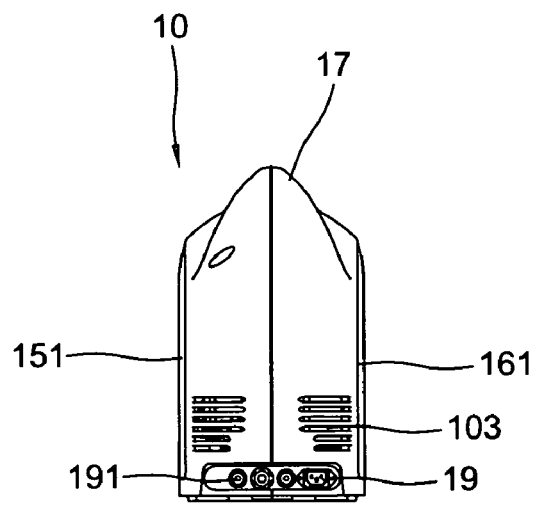

With reference to the drawings and initiated from FIGS. 1, 2 and 3, the structural improvement for a water purifier of the present invention comprises a main body 10 which is combined with a pair of symmetrically formed half housings 106 and 107. The half housing 106 has a plurality of insertion bars 1061 spacedly formed on the bottom to engage with a plurality of insertion hole 1071 spacedly formed in the bottom of the half housing 107 so that the two housings 106 and 107 are assembled. A rectangular plate 105 inlays in the front side of the main body 10. A water discharging button 108 on a top above the rectangular plate 105. Between them is a water outlet 18. A cup seat 109 on a bottom beneath the rectangular plate 105. A motor unit 11 in the rear end of the body 10 which connects external water source and leads the water flowing into the pipeline 111 and adapters 112 on front side of the motor unit 11 having a card type electric circuit plate 104 on one side near the top thereof. On the backside of the main body 10, there is a number of pipes 191 which are functioned to lead in the fresh water and or release the waste water (as show in FIG. 6). A socket 19 on the right side of the pipes 191 and a plurality air vents 103 above the socket 19. A flat rectangular rack 12 is secured in the center portion of the main body 10 and is secured by screws. A plurality of retaining rings and the C-shaped retaining ring spacedly disposed to each side of the rack 12 abutting the edges for respectively and horizontally disposing the membrane pipe 13 and the filter elements 13. (the installation of the pipeline 111 the adapters 112, the filter element 13 and the membrane pipes 14 are of conventional art, here no needs repetitious description). The main body 10 has a large opening 15 and 16 in each of the lateral sides for facilitating the assembly or disassembly the components. Each of the openings 15 and 16 has a lid 151 and 161 and each of the lid 151 and 161 has a pair of protrusions 1511 and 1611 spacedly formed on the top for securing the lids 151 and 161 to the main body 10. A concave formed in each of the lateral bottom of the body 10 beneath the lids 151 and 161 for facilitating the opening of the lids 151 and 161 by finger. On the top of the main body 10, there is a handle 17 (as show in FIGS. 4 and 5), by which the water purifier is portable and a U-shaped tray 1072 in the body 10 beneath an insertion slot in a top of the body 10 for engaging with the card type electric circuit plate. The socket 19 on the back of the main body 10 adopts IEC personal computer type plug and the separated electric wire so that the user would not be tripping over. The electric circuit card is selective so that the user may buy a desired card for different usage. Further, in the main body 10, there is an electronic sensor and the automatic shut off device to prevent the water purifier from leaking water. In use, when press down the button 108, the high amount of TDS (total dissolved solids) waste water will be released for about five seconds previous to discharge the pure water from the water outlet 18. Thus, there must be no TDS in the pure water. Since the filter elements 13 and the membrane pipes 14 are automatically connected with the adapters 112 of the pipeline 111, the freshwater will be totally purified. If the user wants to change any one of the filter elements 13 and/or the membrane pipes 14. He just opens the relevant lids 151 or 161, the change is readily obtained. Which prevents the waste of material. The socket 19, the air vents 103 as well as the water pipes 191 are of hidden type in addition to the curved outlook of the main body 10 and the handle 17. This water purifier is one of the streamlined structure. The selective electric circuit card facilitates the user to buy his desired electric circuit card. The adapting PC computer type IEC electric wire which is readily to hide and prevent to strip over people and the purified water contains no TDS.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. A structural improvement for a water purifier comprising:
    a main body which is combined with a pair of symmetrically formed first and second half housings, wherein the first half housing has a plurality of insertion bars spacedly formed on bottom engaged with a plurality of insertion hole spacedly formed in bottom of the second half housing by which the housings are combined;
    a motor unit disposed in a rear end of said main body connecting respectively to a water source via a pipe in a back of said body and a pipeline in front of it, wherein the pipeline has a plurality of adapters on end of pipes;
    a U-shaped tray in said body beneath an insertion slot in a top of said main body for engaging an electric circuit plate on one side of said pipeline;
    a flat rectangular rack disposed in center of said main body having a plurality of retaining rings and a plurality of C-shaped retaining rings spacedly formed on two sides abutting edges thereof for respectively disposing a plurality of membrane pipes and a plurality of filter elements which are horizontally and superimposedly arranged and automatically engaged with the adapters of said pipeline;
    a large opening in each lateral side of said main body each having a lid to cover on;
    a rectangular plate covering front side of said main body, a button on a top of the main body with a water outlet positioned thereteween and a cup seat on bottom beneath the rectangular plate;
    several water pipes in rear side above bottom of said main body aside a socket and plurality of air vents above said pipes and said socket;
    an arcuate handle on the top of said main body for carrying said main body.

2. The structural improvement as recited in claim 1, wherein said lid each has a pair of retaining protrusions on top thereof.

3. The structural improvement as recited in claim 1, wherein said large openings each has a concave in bottom thereof.

4. The structural improvement as recited in claim 1, further has a selective electric circuit card insertible into the slot in the top of said main body.

5. The structural improvement as recited in claim 1, further has a sensor and a water shut up device inside said main body.

6. The structural improvement as recited in claim 1, further has a PC computer plug and a separated electric wire.

7. The structural improvement as recited in claim 1, further has a TDS (total dissolved solids) remover device.

* * * * *